United States Patent [19]

Helling et al.

[11] 4,294,920
[45] Oct. 13, 1981

[54] PHOTOGRAPHIC SILVER HALIDE EMULSION

[75] Inventors: Günter Helling, Siegburg; Wilhelm Saleck, Bergisch-Gladbach; Peter Bergthaller, Cologne, all of Fed. Rep. of Germany

[73] Assignee: Agfa-Gevaert Aktiengesellschaft, Leverkusen, Fed. Rep. of Germany

[21] Appl. No.: 212,890

[22] Filed: Dec. 4, 1980

Related U.S. Application Data

[63] Continuation of Ser. No. 32,555, Apr. 23, 1979, abandoned.

[30] Foreign Application Priority Data

Apr. 27, 1978 [DE] Fed. Rep. of Germany ....... 2818678

[51] Int. Cl.³ ........................... G03C 1/02; G03C 1/72
[52] U.S. Cl. .................................... 430/569; 430/609; 430/629
[58] Field of Search ............... 430/569, 629, 609, 217, 430/230, 238, 545, 377

[56] References Cited

U.S. PATENT DOCUMENTS

| 3,046,129 | 7/1962 | Graham | 430/629 |
|---|---|---|---|
| 3,046,134 | 7/1962 | Dann | 96/114 |
| 3,046,135 | 7/1962 | Beavers | 96/114 |
| 3,419,392 | 12/1968 | Thompson | 96/95 |
| 3,531,829 | 9/1970 | Wood | 96/94 R |
| 3,625,697 | 12/1971 | Sato | 96/109 |
| 3,748,143 | 7/1973 | Bowman | 96/114 |
| 3,860,428 | 1/1975 | Ponticello | 96/114 |
| 3,986,877 | 10/1976 | Timmerman | 96/95 |
| 4,013,471 | 3/1977 | Pollet | 430/629 |
| 4,046,576 | 9/1977 | Terwilliger | 96/94 R |
| 4,057,429 | 11/1977 | Debrabandere | 96/94 R |
| 4,072,526 | 2/1978 | Sels | 430/629 |
| 4,145,218 | 3/1979 | Habu | 96/109 |

*Primary Examiner*—Mary F. Downey
*Attorney, Agent, or Firm*—Connolly and Hutz

[57] ABSTRACT

A polymer of at least one compound A with at least one compound B, in which A and B correspond to the following formulae

A:

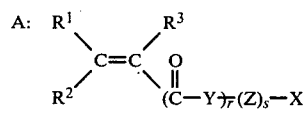

B:

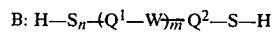

is useful in light sensitive photographic materials comprising at least one silver halide emulsion layer.

6 Claims, No Drawings

PHOTOGRAPHIC SILVER HALIDE EMULSION

CROSS REFERENCE

This application is a continuation of pending application Ser. No. 32,555 filed Apr. 23, 1979 for "Photographic Silver Halide Emulsion" by Gunter Helling et al now abandoned.

This invention relates to a photographic material having at least one silver halide emulsion with increased sensitivity which contains novel polymers as sensitivity increasing additives.

The sensitivity of a photographic silver halide emulsion to light can be influenced in two ways. First, it can be increased by suitable choice of the physical conditions during precipitation and so-called physical ripening of the silver halide. This possibility is in practice limited by the fact that the increase in sensitivity is accompanied by an increase in grain size, whereby the quality of the image finally obtained is deleteriously affected. What is desired is a combination of high sensitivity and small grain in the silver halide emulsions.

Second, the sensitivity of photographic emulsions can be influenced chemically by the addition of chemical compounds, generally referred to as chemical sensitizers.

In principle, such compounds can be added at any stage of preparation of the emulsion, e.g. they could be added as ripening additives before chemical ripening or they could be added to the finished casting solution after chemical ripening. Suitable ripening additives include e.g. noble metal salts, in particular gold salts, and sulphur compounds such as thiosulphates or organic, in particular heterocyclic sulphur compounds.

One disadvantage of chemical sensitization is that the increase in sensitivity is found to be accompanied by an increased tendency of the emulsion to form a uniform developable fog. For this reason, powerful chemical sensitizers such as compounds with an onium structure, e.g. quaternary ammonium or phosphonium salts or ternary sulphonium salts or polyalkylene oxides and polyalkylene oxide derivatives may only be added to the finished casting solution after chemical ripening. Addition of these substances before chemical ripening would cause such severe fogging of the photographic silver halide emulsions that the emulsions would be virtually unusable.

Sensitivity increasing additives may also be added during precipitation of the silver halide, or precipitation may be carried out in the presence of such additives. Most of the chemical sensitizers cannot be used at this stage since, as already indicated above, they would either cause excessive fogging or not provide sufficient increase in sensitivity.

Precipitation of silver halide is generally carried out using gelatine which has proved to be a particularly suitable agent for peptisation on account of its suitable dispersing and protective colloid properties. In addition, gelatine acts as halogen acceptor in the photographic process and has excellent gel forming properties as well as other advantageous characteristics which have made it the preferred peptisation agent for photographic silver halide emulsions.

It is, however, difficult to prepare gelatine of uniform quality and with consistent physical and photographic properties. Most of these properties are deleteriously affected by bacterial decomposition during storage or by hydrolysis during processing. Moreover, since gelatine is a naturally occurring substance, it contains a wide range of impurities which vary according to its origin, some of which may be advantageous while others are harmful, and it is subject to dimensional changes in response to changes in temperature and moisture.

Since the photographic properties of a silver halide emulsion are to a large extent determined by the conditions under which precipitation is carried out, there have been many attempts to replace gelatine by other suitable peptisation agents, in particular by semisynthetic or completely synthetic substances, e.g. artificial polymers. However, no overall major improvement has been obtainable by the use of such substitutes. Thus, for example, phthalated gelatine (U.S. Pat. No. 2,614,928) has disadvantages similar to those of gelatine itself. Although polyvinyl pyrrolidone and polyvinyl alcohol are suitable protective colloids, they have a considerable inhibitory effect on the growth of the grain. Copolymers of acrylamide and its derivatives have also been proposed as peptisation agents (U.S. Pat. No. 2,811,494).

Polymers of copolymerised vinyl sulphide monomers and other olefinically unsaturated monomers have been described in British Pat. No. 1,485,057. These copolymers contain thia groups in the side chain. A process for the preparation of emulsions in which a polymer of vinyl monomers containing divalent sulphur atoms and of alkyl acrylate or alkyl methacrylate is used as peptisation agent has been described in British Pat. No. 1,365,489. The main disadvantage of the polymers containing thia groups is that they can either only be obtained by complicated preparation methods, e.g. using toxic starting compounds, or prove to be unstable, particularly in the presence of silver ions.

The need therefore remains for synthetic materials which are equal to gelatine in their protective colloid action, stable to the changes in pH which inevitably occur during preparation of the emulsion, and compatible with gelatine. Although most of the synthetic polymers described show some improvement in certain mechanical properties, such as dimensional stability and swelling properties, this improvement is generally obtained at the expense of the relationship of sensitivity to graininess in the photographic materials. Moreover, the monomers required for some of the polymers which have been proposed can only be obtained by complicated, multi-stage methods of preparation.

It is an object of this invention to provide an inexpensive and easily prepared binder for photographic silver halide emulsions which is suitable as peptisation agent and therefore capable of partly or completely replacing gelatine during precipitation and in which the disadvantage of the known peptisation agents are reduced or substantially obviated. The novel peptisation agent should increase the sensitivity of the photographic silver halide emulsions without substantially increasing the size of the grain. In addition, the developability of the emulsion, especially at the beginning of the development and the covering power of the silver formed by development should be improved.

This invention relates to a light sensitive photographic material having at least one silver halide emulsion layer, characterised by containing a polymer of at least one compound A with at least one compound B, in which A and B correspond to the following formulae:

A: 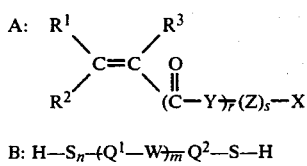

B: H—S$_n$—(Q$^1$—W$)_{\overline{m}}$Q$^2$—S—H in which,

R$^1$, R$^2$ and R$^3$ which may be the same or different, represent hydrogen, substituted or unsubstituted alkyl, in particular with 1 to 4 carbon atoms, or substituted or unsubstituted aryl;

Y represents oxygen or —NR$^4$—;

R$^4$ represents hydrogen or an alkyl group, in particular one having 1–4 carbon aoms;

Z represents substituted or unsubstituted alkylene, in particular one having from 1 to 4 carbon atoms, or a substituted or unsubstituted arylene, in particular phenylene;

X represents NR$^1$R$^2$, H, OH, SO$_3$H, PO$_3$H, COOH or a heterocyclic group;

Q$^1$, Q$^2$ which may be the same or different represent a substituted or unsubstituted alkylene or arylene group, in particular one which is substituted with X; or a heterocyclic group;

W represents oxygen or sulphur;

n, m, r, and s are the same or different and represent 0 or 1.

The substituents in the compounds corresponding to formulae A and B may be any of the usual substituents, for example hydroxyl, carboxyl or amine groups.

The compounds A are primarily water-soluble compounds, e.g polymerisable compounds having carboxylic acid, sulphonic acid or phosphonic acid groups. Particularly preferred compounds of formula A are those in which R$^1$ and R$^2$ are hydrogen, R$^3$ is hydrogen or methyl, and X is SO$_3$H, COOH, CONH$_2$ or a 5- or 6-membered heterocyclic group containing nitrogen, in particular the group

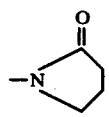

and/or X is hydrogen when s=0.

The following are examples of suitable comonomers (A):

Acrylic acid, methacrylic acid, vinylsulphonic acid, styrene sulphonic acid, allyl sulphonic acid, methallyl sulphonic acid, 2-acrylamido-2-methyl-propane sulphonic acid; methacrylamidobenzene sulphonic acid, acrylamido benzene sulphonic acid, sulphopropylmethacrylate, sulphoethylmethacrylate, sulphoethylacrylate, sulphopropylacrylate, acrylamidoglycollic acid and salts of these acids; hydroxyethylmethacrylate, hydroxyethyl, acrylate, hydroxypropylmethacrylate, hydroxypropyl acrylate, vinylpyridine, acrylamide, methacrylamide, N-vinylpyrrolidone, N-vinylimidazole, dimethylaminoethylmethacrylate, N,N-diethylaminoethylmethacrylate or the corresponding quaternary salts of the basic monomers.

Preferred compounds according to formula B correspond to the following formulae:

(1) HS—R$^5$—X in which R$^5$ represents an alkylene group, in particular having 1 to 4 carbon atoms, which may in turn be substituted, or arylene, in particular phenylene, which may in turn be substituted, and in which X has the meanings indicated for compound A; or

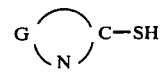 (2)

in which G represents the members required for completing a preferably 5- or 6-membered ring, in particular those required for completing an oxazole, imidazole, pyrrole, tetrazole, thiazole, pyridine, pyrimidine or pyrazole ring, any of which heterocyclic rings may also carry a condensed aromatic ring, in particular a benzo ring, which may be substituted, or (3) HS—(Q$^1$—W$)_{\overline{m}}$Q$^2$—S—H in which Q$^1$ and Q$^2$ represent ethylene when m=1; Q$^2$ represents alkylene or a heterocyclic group when m=0.

Compounds which may be used as mercaptans (B) according to the invention include e.g. 2-mercaptoethylamine, N-(2-mercaptoethyl)-cyclohexylamine, (2-mercaptoethyl)-trimethylammonium bromide or the corresponding acetate, 2-mercaptoaniline, 3-mercaptoaniline, 4-mercaptoaniline, mercaptoanisole, 2-mercaptobenzimidazole, 2-mercaptobenzoic acid, 2-mercaptobenzothiazole, 2-mercaptobenzoxazole, 2-mercapto-4-(3H)-quinazolinone, 2-mercaptoquinoline, mercaptoacetic acid, ethyl mercaptoacetate, methyl mercaptoacetate, 2-mercapto-1-methylimidazole, 2-mercapto-4-methylpyrimidine, 1-mercapto-3-phenylpropane, 5-mercapto-1-phenyl-1,2,3,4-tetrazole, 3-mercapto-1,2-propenediol, 3-mercaptopropionic acid, 2-mercaptopropionic acid methyl ester, 2-mercaptopurine, 6-mercaptopurine, 2-mercapto-6,8-purinediol, 2-mercaptopurin-6-ol, 6-mercaptopurin-2-ol, 8-mercaptopurin-6-ol, 2-mercaptopyrimidine, 4-mercapto-1H-pyrazolo(3,4-l)pyrimidine, 4-mercaptopyrimidine, 2-mercaptopyridine-N-oxide, thiobarbituric acid, and 1,2-bis-(mercaptomethyl)-4,5-dimethylbenzene.

The following are particularly preferred mercaptans corresponding to formula B: 2-Mercaptoethanol, DL-mercaptosuccinic acid, 2-mercaptopropionic acid, cystein, bis-(2-mercaptoethyl)-ether, bis-(2-mercaptoethyl)-sulphide, bis-mercaptothiadiazole, 2-mercaptothiazoline and 1,2-bis-mercaptoethane and the following triazoles:

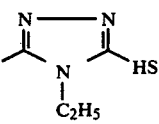

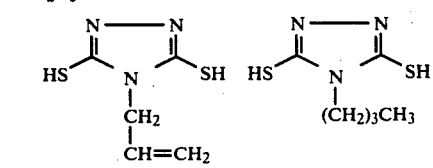

-continued

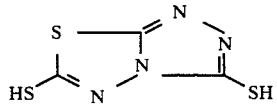

In some cases it may be advantageous to incorporate a limited quantity, e.g. up to 20 mol % of other, less water-soluble polymerizable monomers in order to obtain particular effects such as elasticity or particular swelling properties. Examples of such monomers include acrylonitrile, acrylic acid esters and N-substituted acrylamides and methacrylamides.

The molecular weight of the copolymers used according to the invention is generally within the range of approximately 5000 to 500 000. The proportion of compound B in the polymer of compounds A and B is preferably from 0.01 to 20% by weight, most preferably from 0.1 to 10% by weight, based on the polymer.

The invention also relates to a process for the preparation of a photographic material having at least one silver halide emulsion by precipitation and chemical ripening of the silver halide in the presence of a peptisation agent according to the invention followed by flocculation of the emulsion, washing if indicated, redispersion and chemical ripening.

Preparation of the polymers to be used according to the invention may be carried out by various methods. The known polymerization initiators such as potassium peroxodisulphate, azo-bis-isobutyronitrile, benzoperoxide or Redox initiators may be used, as described in "Chemie und Physik der Polymeren", by Ian M. G. Cowie, Page 52, publishers Chemie Weinheim, New York 1976. Polymerization may be carried out, for example, in solution or emulsion or as precipitation polymerization but solution and precipitation polymerization processes are the most suitable for the preparation of photographic binders. The temperature at which the polymers according to the present invention are prepared may vary within a wide range since the most suitable temperature depends on various factors, such as the particular monomers used, the reaction time and the initiator system employed. The polymerisation temperature employed does not generally exceed 110° C. and is in most cases from 20° to 80° C. Polymerisation may be carried out in a suitable medium for example, in water or a mixture of water with a water-miscible solvent such as methanol, ethanol, propanol, isopropanol or butyl alcohol. The concentration of polymerisable monomers in the polymerisation mixture may be varied within a wide range, satisfactory results being obtained with concentrations of approximately from 5 to 30% by weight, based on the total quantity of polymerisation mixture.

Another method of preparing the polymers according to the invention consists of using mercaptans in combination with an oxidizing agent as Redox initiators. Initiator systems of this type have been described in Makromol. Chem. 177 (1976) on pages 2912 to 2926 and in J. Polym. Sci., Chem. Ed. 9 (1971) 253. The mercaptans corresponding to formula B may be used as reducing agents. The oxidizing agents used may be any oxidants, provided that they react with mercaptans to form thio radicals which initiate polymerisation. Examples of suitable oxidizing agents include potassium bromate, potassium peroxodisulphate, hydrogen peroxide, copper-II chloride, cerium-IV sulphate and similar compounds. The polymers to be used according to the invention may, of course, be further purified if desired. The usual purification processes well known to the man of the art may be employed, such as reprecipitation, dialysis, electrodialysis or gel chromatography. In some cases, residual quantities of mercapto groups which are partly contained in these polymers are best converted by a chemical reaction in order to prevent fogging of the emulsions which are prepared with the polymers used according to the invention. The following chemical reactions may be employed for conversion of the residues of mercapto groups: Radical additions to unsaturated compounds, nucleophilic addition to unsaturated compounds and homocyclic or heterocyclic compounds, chemical or electrochemical oxidation reactions or other reactions which result in conversion of the mercapto groups.

Examples of the preparation of polymers to be used according to the invention are given below:

Polymer 1

142 g of acrylamide and 0.06 g of 2-mercaptoethanol are dissolved in 1000 g of water under nitrogen and heated to 35° C. 1.62 g of potassium peroxodisulphate dissolved in 300 ml of water are added dropwise, a further 200 ml of water are added and the mixture is stirred for 4 hours at 35° C. It is then precipitated in 5 liters of acetone and filtered, and the residue is dissolved in 1 liter of water and precipitated in 2.5 liters of acetone.

Polymer 2

142 g of acrylamide and 0.62 g of bis-mercaptoethyl sulphide are dissolved in 1000 g of water under nitrogen and heated to 35° C. 16.2 g of potassium peroxo disulphate dissolved in 300 ml of water are added dropwise, a further 200 ml of water are added, and the mixture is stirred for 4 hours at 35° C. It is then precipitated in 5 liters of acetone, the precipitate is filtered off and the residue is dissolved in 1 liter of water and precipitated in 2.5 liters of acetone.

Polymer 3

A copolymer is prepared by the procedure described for polymer 2 but using 142 g of acrylamide, 1.23 g of bis-mercaptoethylsulphide and 32.4 g of potassium peroxodisulphate.

Polymer 4

A copolymer is prepared by the method described for polymer 2, using 142 g of acrylic acid, 2.5 g of bis-mercaptoethylsulphide and 2.2 g of potassium peroxodisulphate.

Polymer 5

71 g of acrylamide and 0.6 g of 2,5-dimercapto-1,3,4-thiadiazole are introduced into 350 ml of water under nitrogen and heated to 35° C. 16.2 g of potassium peroxodisulphate dissolved in 400 ml of water are then added dropwise within 45 minutes. The mixture is stirred for a further 3 hours at 35° C., 1 liter of acetone is then added dropwise and the precipitate formed is separated. 600 ml of water are added to the precipitated product, and the cloudy solution obtained is filtered. 1 Liter of acetone is added to the filtrate, and the polymer which precipitates is separated and washed with acetone.

The polymers to be used according to the invention are preferably added to the photographic silver halide emulsion before chemical ripening, preferably already at the precipitation stage. The quantity to be added depends on the required effect and can easily be determined by a few simple tests in the usual manner.

The copolymers are used according to the invention in quantities which produce an increase in sensitivity. For example, from 10 to 100% by weight of the peptisation agent used as protective colloid during precipitation of the silver halide may consist of the polymer according to the invention while the remainder may consist of gelatine. The polymers according to the invention are generally used in quantities of from 500 mg to 500 g, preferably 1 g to 200 g, per mol of silver halide to be precipitated.

The substances to be used according to the invention are preferably added in the form of their aqueous solutions. Their concentration in these solutions is not critical and may vary within wide limits. The polymers must be sufficiently soluble in water in order to allow a sufficiently concentrated aqueous solution to be prepared. It is sufficient, for example, to use aqueous solutions at concentrations of from 1 to 5%. More highly concentrated solutions may, of course, be employed if the substances are exceptionally soluble.

The solutions are generally prepared at a pH of approximately 7 although a slightly acid pH may be maintained, e.g. at 5 to 7, or in the case of so-called ammoniacal emulsions the pH of the solution may even range from 5 to 9.

The polymers, being synthetic materials, are consistent in quality. It is surprisingly found that they produce a considerable increase in sensitivity without substantial coarsening of the silver halide grain. Other advantages include rapid onset of development of the silver halide emulsions and in some cases increased covering power of the silver formed in development.

The substances according to the invention may be used in any silver salt emulsions, preferably in silver halide emulsions. The silver halides used may be silver chloride, silver bromide or mixtures thereof, which may have a small silver iodide content of up to 10 mol %. The silver halides may be dispersed in the usual hydrophilic binders, for example in carboxymethylcellulose, polyvinyl alcohol, polyvinyl pyrrolidone, alginic acid or its salts, esters or amides, or proteins, preferably gelatine.

The polymers to be used according to the invention may be used in any of the usual processes for the preparation of photographic emulsions, for example, in single jet, double jet or precipitation processes as discussed in U.S. Pat. Nos. 3,206,313 and 2,592,250.

The emulsions may also contain other chemical sensitizers, e.g. quaternary ammonium and phosphonium salts and ternary sulphonium salts, reducing agents such as tin-II salts, polyamines such as diethylene triamine or sulphur compounds as described in U.S. Pat. No. 1,574,944. The emulsions may also contain salts of noble metals such as ruthenium rhodium, palladium, iridium, platinum or gold for chemical sensitization, as described in the article by R. Koslowsky, Z. Wiss. Phot. 46, 65 to 72 (1951). The emulsions may also contain polyalkylene oxides or polyalkylene oxide derivatives as development accelerators or chemical sensitizers. An additional increase in sensitivity is then obtained.

The emulsions may be spectrally sensitized, e.g. with the usual monomethine or polymethine dyes such as acid or basic cyanines, hemicyanines, streptocyanines, merocyanines, oxonoles, hemioxonoles, styryl dyes or others, including trinuclear or higher nuclear methine dyes, for example rhodacyanines or neocyanines. Sensitizers of this type have been described, for example in the work by F. M. Hamer entitled "The Cyanine Dyes and Related Compounds", (1964), Interscience Publishers John Wiley and Sons. The emulsions may contain the usual stabilizers, e.g. homopolar compounds or salt type compounds of mercury having aromatic or heterocyclic rings (such as mercapto triazoles), simple mercury salts, sulphonium mercury double salts and other mercury compounds. Azaindenes are also suitable stabilizers, particular tetra and penta azaindenes and especially those which are substituted with hydroxyl or amino groups. Compounds of this type have been described in the article by Birr, Z. Wiss. Phot. 47, 2–58 (1952). Other suitable stabilizers include heterocyclic mercapto compounds, e.g. phenylmercaptotetrazole, quaternary benzo thiazole derivatives and benzotriazole.

The emulsions may be hardened in the usual manner, for example with formaldehyde or halogen substituted aldehydes which contain a carboxyl group, such as mucobromic acid with diketones, methanesulphonic acid esters, dialdehydes or polyfunctional triazine derivatives such as trisacryloyl-hexahydrotriazine or halogenated or alkoxy substituted hexahydrotriazine derivatives.

The compounds according to the invention produce their advantageous effect not only in black-and-white emulsions but also in the production of colour photographic images. They are compatible with the usual colour couplers. The polymers may also be used in direct positive emulsions, e.g. those with a layered grain structure according to French Pat. No. 1,585,791. They are also suitable for emulsions used in the silver dye bleaching process or the dye diffusion process.

The polymers produce an exceptionally advantageous effect in silver halide emulsions which are precipitated in the presence of silica sols. The preparation of such emulsions has been described in German Offenlegungsschrift No. 1,797,254 and in U.S. Pat. No. 3,637,391. According to another preferred embodiment, the polymers are used in combination with polymers which contain disulphone imide groups. Compounds of this type have been described in German Pat. No. 1,089,548 and U.S. Pat. No. 3,052,656. The polymeric disulphone imides are added before chemical ripening, in particular at the stage of precipitation of the flocculate. The concentration of the disulphoneimides may vary within wide limits. Quantities of from 1 to 10%, based on the total quantity of peptisation agent during precipitation, have generally been found to be sufficient.

EXAMPLE 1

Sample 1

The following solutions are prepared for the production of a silver iodobromide gelatine emulsion:
Solution (A)
  1000 ml water
  10 g gelatine
  30 g potassium bromide
  2 g potassium iodide Temperature 50° C.
Solution (B)
  1000 ml water
  40 g silver nitrate Temperature 45° C.

Solution B is steadily poured into solution A within 5 minutes. The mixture is left to digest for 30 minutes at 50° C. and then cooled to 20° C. 10 ml of a 10% aqueous polystyrene sulphonic acid solution are added and the pH is reduced to 3.0 by the addition of sulphuric acid (25%) to flocculate the emulsion. The flocculate is left to settle and the supernatant solution is poured off. For chemical ripening, the flocculate is dissolved in 2000 ml of a 10% aqueous gelatine solution (pH 7.5) at 40° C.

When the flocculate has been dissolved, the pH is adjusted to 6.5, the required quantity of sulphur ripening agent and gold salts is added and the emulsion is ripened to full sensitivity at 55° C. 10 ml of a 5% aqueous solution of saponin (wetting agent), 10 ml of a 10% aqueous solution of formaldehyde (hardener) and 20 ml of a 1% methanolic solution of 4-hydroxy-6-methyl-1,3,3a,7-tetra-azaindene (stabilizer) are added per kg of emulsion, and the emulsion is cast on a cellulose acetate substrate. After exposure behind a step wedge in a conventional sensitometer and development (7 minutes and 16 minutes at 20° C.) in a developer of the following composition:

| | |
|---|---|
| Sodium sulphite sicc. | 70.0 g |
| Borax | 7.0 g |
| Hydroquinone | 3.5 g |
| p-Monomethylaminophenolsulphate | 3.5 g |
| Sodium citrate | 7.0 g |
| Potassium bromide | 0.4 g |

Made up with water to 1 liter the emulsion is assessed sensitometrically.

Samples 2–5

Preparation of the emulsion and examination are carried out in the same manner in each case but in solution A, gelatine is replaced successively by the same quantity of weight in the various polymers 1 to 5 described above.

From Table 1 below it may be seen that emulsions 2 to 6 (containing polymers 1 to 5) have a higher sensitivity than the comparison emulsions.

| Experiment No. | Protective Colloid | 7 Minutes Development | | | 16 Minutes Development | | |
|---|---|---|---|---|---|---|---|
| | | Sensitivity | γ | Fog | Sensitivity | γ | Fog |
| 1 | Gelatine | 100 | 0.90 | 0.13 | 300 | 0.95 | 0.23 |
| 2 | Polymer 1 | 600 | 1.45 | 0.11 | 800 | 1.80 | 0.24 |
| 3 | Polymer 2 | 400 | 0.95 | 0.11 | 600 | 1.15 | 0.20 |
| 4 | Polymer 3 | 500 | 0.75 | 0.06 | 650 | 0.95 | 0.08 |
| 5 | Polymer 4 | 150 | 1.76 | 0.15 | 300 | 1.70 | 0.18 |
| 6 | Polymer 5 | 320 | 0.88 | 0.04 | 320 | 1.08 | 0.05 |

We claim:
1. A light sensitive photographic silver halide emulsion containing silver halide particles dispersed in a hydrophilic colloid binder composition wherein the improvement comprises
the binder composition contains 500 mg to 500 g per mol of the silver halide and up to 100% of the binder composition of a polymer
wherein the polymer used contains recurring units of compound A
with recurring units of compound B, said compound B being in an amount of 0.01 to 20% by weight of said polymer, and said polymer having an S-atom in the main chain, which compounds A and B correspond to the following formulae:

Formulae A and B

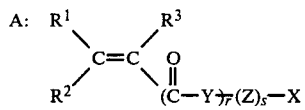

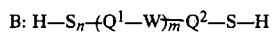

in which
$R^1$, $R^2$ and $R^3$ which may be the same or different, represent hydrogen or substituted or unsubstituted alkyl or aryl;
Y represents oxygen or $—NR^4—$;
$R^4$ represents hydrogen or alkyl, in particular with 1 to 4 carbon atoms;
Z represents a substituted or unsubstituted alkylene or a substituted or unsubstituted arylene;
X represents $NR^1R^2$, H, OH, $SO_3H$, $PO_3H$, COOH or a heterocyclic group;
$Q^1$ and $Q^2$ which may be the same or different represent a substituted or unsubstituted alkylene or arylene group or a heterocyclic group;
W represents oxygen or sulphur and
n, m, r and s which may be the same or different, represent 0 or 1;
the said polymer being a peptizing agent, and, the remainder of the binder composition being made up with protective colloid.

2. Photographic material according to claim 1, characterised in that compound B corresponds to one of the following formulae:

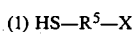

or

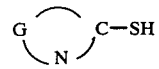 (2)

or

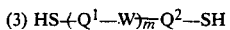

in which
$R^5$ represents substituted or unsubstituted alkylene or phenylene;
G represents the members required to complete a 5-membered or 6-membered ring, which members may carry a condensed aromatic ring;
$Q^1$ and $Q^2$ represents alkylene when m=1;
$Q^2$ represents alkylene or a heterocyclic group when m=0 and
in which X has the meaning indicated in claim 1.

3. Photographic material according to claim 1, characterised in that $Q^1$ and/or $Q^2$ represents ethylene.

4. Photographic material according to claim 1, characterised in that the polymer is built up of units of acrylic acid and mercapto ethanol and/or acrylamide and bis-mercaptoethylsulphide.

5. Light-sensitive photographic material having at least one silver halide emulsion layer, characterized by containing as a peptizing agent 500 mg to 500 g per mol of the silver halide and up to 100% of the agent a polymer wherein the polymer used contains recurring units of compound A with recurring units of compound B, said compound B being in an amount of 0.01 to 20% by weight of said polymer, and said polymer having an S-atom in the main chain, said compounds A and B correspond to the following formulae:

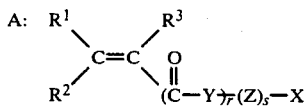

B: 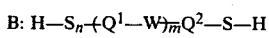

in which
- $R^1$ and $R^2$ represent hydrogen;
- $R^3$ represents hydrogen or methyl;
- X represents $SO_3H$, COOH, $CONH_2$ or a heterocyclic group containing nitrogen and/or hydrogen when $s=0$;
- Y represents oxygen or $-NR^4-$;
- $R^4$ represents hydrogen or alkyl, in particular with 1 to 4 carbon atoms;
- Z represents a substituted or unsubstituted alkylene or a substituted or unsubstituted arylene;
- $Q^1$ and $Q^2$ which may be the same or different represent a substituted or unsubstituted alkylene or arylene group or a heterocyclic group;
- W represents oxygen or sulphur and n, m, r and s which may be the same or different, represent 0 or 1;

the remainder of the agent being made up with protective colloid.

6. In the process for the preparation of a photosensitive silver salt emulsion by precipitation and physical ripening of the silver salt in the presence of a peptisation agent, characterized in that precipitation of the silver salt is carried out in the presence of a hydrophilic binder composition for the silver salt emulsion the binder composition contains 500 mg to 500 g per mol of the silver salt and up to 100% of the binder composition of a polymer wherein the polymer used contains recurring units of compound A with recurring units of compound B, said compound B in an amount of 0.01 to 20% by weight of said polymer and said polymer having an S-atom in the main chain, which compounds A and B correspond to the following formulae:

Formulae

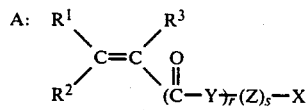

B: 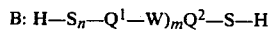

in which
- $R^1$, $R^2$ and $R^3$ which may be the same or different, represent hydrogen or substituted or unsubstituted alkyl or aryl;
- Y represents oxygen or $-NR^4-$;
- $R^4$ represents hydrogen or alkyl, in particular with 1 to 4 carbon atoms;
- Z represents a substituted or unsubstituted alkylene or a substituted or unsubstituted arylene;
- X represents $NR^1R^2$, H, OH, $SO_3H$, $PO_3H$, COOH or a heterocyclic group;
- $Q^1$ and $Q^2$ which may be the same or different, represent a substituted or unsubstituted alkylene or arylene group or a heterocyclic group;
- W represents oxygen or sulphur; and
- n, m, r and s which may be the same or different, represent 0 or 1; the remainder of the binder composition being made up with protective colloid.

* * * * *